Sept. 20, 1955     W. C. BOYLE ET AL     2,718,117
NESTABLE, FLEXIBLE CORRUGATED PIPE
Filed Aug. 22, 1951
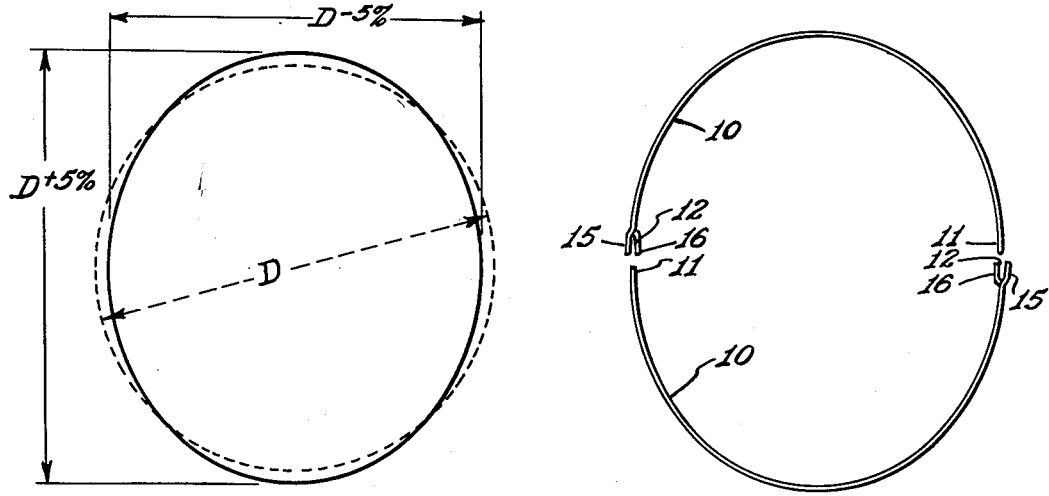
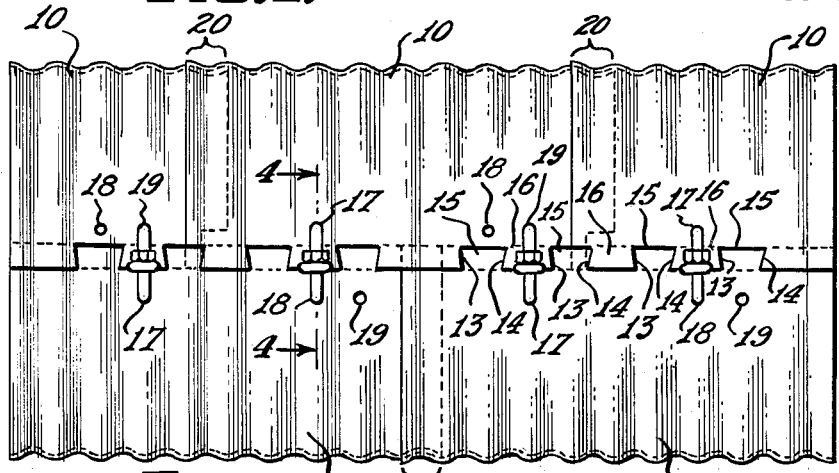
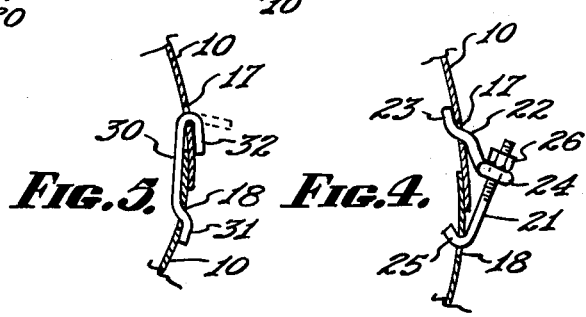
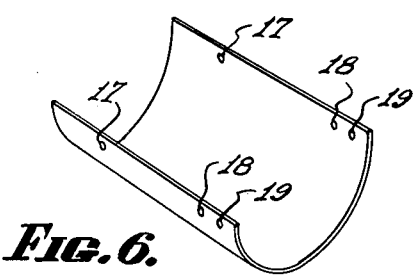
INVENTOR.
WILLIAM CHARLES BOYLE
AND MAX H. BURSK,
BY
*Allen & Allen*
ATTORNEYS.

United States Patent Office 2,718,117
Patented Sept. 20, 1955

2,718,117

NESTABLE, FLEXIBLE CORRUGATED PIPE

William Charles Boyle and Max H. Bursk, Middletown, Ohio, assignors to Armco Steel Corporation, Middletown, Ohio, a corporation of Ohio Application August 22, 1951, Serial No. 243,038

4 Claims. (Cl. 61—16)

This invention relates to nestable, flexible corrugated metal pipe.

It is known that the load carrying ability of a flexible corrugated metal pipe can be increased by changing its shape, and in the past various means have been used not only in the plant but at the installation site for changing the shape. In general, at the installation site it has been customary to change the shape by using jacks to produce the shape change and timber caps, sills and struts to retain the changed shape. These devices and methods have proved unsatisfactory, because of the fact that the installation of the necessary timber struts are performed by untrained workmen, the desired results are seldom obtained. Furthermore, on account of the way in which such pipe has been joined at the side by notches, seats or flanges retained with fasteners it has frequently resulted in the production of the required elongation of the vertical axis of the pipe by a vertical slippage at the side joints of the top and bottom sections, rather than by an actual change in the true shape of the structure, as is desired. For the reasons given above steel strutting has not proved satisfactory.

Various devices and methods for prestrutting the pipe sections in the plant have been relatively expensive and undesirable.

It is an object therefore of the present invention to provide nestable, flexible corrugated metal pipe in sections which can be assembled by unskilled workmen in the field and which will result in a pipe or culvert so shaped that it will carry 100% more embankment load than true round pipe of the same metal thickness. It is another object of the invention to provide such pipe wherein the results outlined above are obtained without further apparatus at the installation site.

These and other objects of the invention which will be pointed out in more detail hereinafter, or which will be apparent as the description proceeds, we accomplish by that certain construction and arrangement of parts of which we shall now disclose exemplary embodiments.

Reference is made to the drawings forming a part hereof and in which:

Figure 1 is a diagrammatic cross-sectional view illustrating the desired final shape of the culvert.

Figure 2 is an end elevational view of two like culvert sections showing how they are related in the final pipe.

Figure 3 is an elevational view of a length of pipe or culvert according to the invention.

Figure 4 is a fragmentary cross-sectional view on an enlarged scale taken on the line 4—4 of Figure 3 and showing one type of fastening device.

Figure 5 is a view similar to Figure 4 showing another type of fastening device.

Figure 6 is a perspective view on a reduced scale and of a diagrammatic nature of a section of pipe or culvert.

Briefly, in the practice of our invention we provide a standard culvert section which is so arranged and designed that an entire culvert or pipe can be installed with a number of identical sections.

The individual sections are preferably corrugated and of semi-elliptical shape in cross-section, i. e., the radius of curvature is at its maximum along the edges of the section, and at its minimum at the midpoint of the section. One edge of each section is left plain and the other edge is provided with seat elements so that two sections may be mutually reversed and inverted and assembled with the plain edge of the one engaging the seat elements of the other to form a culvert or pipe of substantially elliptical cross-section with the major axis in a vertical position. Preferably, the lower sections are lapped and the upper sections are also lapped with the lap joints of the upper and lower sections being in break-joint relationship. Fastening elements are provided to secure the sections together.

Referring now in more detail to the drawing, we have indicated in Figure 1 the relationship between the ideal shape of a culvert or pipe according to our invention and a true circle of the same circumference. A circle is shown by the broken lines as having a diameter D. It will be observed that the pipe has been elongated in a vertical direction and contracted in a horizontal direction so that its vertical diameter is 5% greater than the diameter of a true circle of the same circumference, and so that its horizontal diameter is 5% less than that of the true circle having the same circumference. By way of example; if D equals 60 inches, then the diameter in a vertical plane will be 63 inches, and the diameter in the horizontal plane 57 inches. The pipe according to this invention will carry 100% more embankment load, and under an embankment load it will, when in place, assume a nearly true circular cross-section.

As best seen in Figures 2 and 3, one edge of each section 10 is left plain, as indicated at 11. The other edge, as generally indicated at 12 in Figure 2, is provided with seat elements for the mutually opposed plain edge 11. The seating elements are provided as best seen in Figure 3 by a series of cuts extending inwardly from the edge as indicated at 13 and 14. It will be observed that the cuts 13 and 14 are at an angle to the corrugations with all of cuts 13 being parallel and at a slight angle in one sense with respect to the corrugations, and with all the cuts 14 being parallel, and at a slight angle in the opposite sense with respect to the corrugations, to give a dove-tail appearance. The portions of metal between the cuts are bent alternately inward and outward; thus, the portions 15 are bent outwardly, while the portions 16 are bent inwardly. In end elevation the seat elements will appear as seen in Figure 2, and it will be clear that the plain edge 11 of one section can seat between the portions 15 and 16 of the other section.

It will be noted that each section is provided with three holes along each side. One of these holes 17 is toward one end of the section, while the other two holes 18 and 19 are toward the other end of the section, the holes 18 and 19 being spaced apart a distance equal to the pitch of the corrugations.

In installing the pipe or culvert a series of sections 10 are laid in place with their edges extending upwardly, and in lapped relation with an overlap equivalent to the pitch of the corrugation. This overlap is indicated in Figure 3 at 20. When thus placed, all the seating elements 15, 16 will be along one edge of the assembly of lower sections. The upper sections which constitute the roof are similarly placed except that they are inverted and reversed end for end with respect to the lower sections, and they are then similarly overlapped as at 20.

It will be observed that because the overlap is equal to the pitch of the corrugation, and because the two holes 18 and 19 are provided on each side, spaced apart a distance equal to the pitch of the corrugation, there will at all times be one of the two holes 18, 19 opposite a hole 17 of the opposite section. As will be clear from an examination of Figure 3, each hole 17 of a lower section will be opposite the hole 19 of a corresponding upper section, whereas each hole 17 of the upper section will be opposite a hole 18 of the lower section. Because of the fact that the two holes 18 and 19 are provided as described above, the culvert sections are universal and can all be exactly alike. No distinction need be made as between those sections which are bottom sections and those which are top sections. It will also be clear that when the sections are inverted and reversed the plain edges of all the sections in the upper half of the culvert will be in a position to engage the seating elements 15 and 16 of the lower sections and similarly the plain edges 11 of the lower sections will be in a position to engage the seating element 15 and 16 of the upper sections.

We have illustrated two fastening devices for securing the sections together. In Figure 4 the fastening device consists of a J-bolt 21, and a W-shaped piece 22. The W-shaped piece has one arm 23 passing through a hole 17 in the upper section 10, and its opposite end 24 is flattened and perforated for the passage of J-bolt 21. The hook portion 25 of the J-bolt is engaged in a hole 18 in the lower section, and the J-bolt passes through the hole in the portion 24. A nut 26 serves to draw the sections together and hold them in assembled relation.

The fastening device shown in Figure 5 is considerably simpler and requires even less skill in its application. It comprises a rod-like member having a straight medial portion 30, and an offset portion 31 at one end and a portion 32 at the other end which is bent outwardly in the same plane as the offset 31 at an angle about 90° as indicated by the broken lines in Figure 5. The device may be put in position from the outside of the pipe by inserting the end 32 through the hole 18 and pushing it upward until the end 32 can be made to emerge through the hole 17. At this point the end 32 is bent down as indicated in solid lines, thus holding the pipe sections in assembly.

The particular seating structure shown is not necessarily a limitation on the invention and it will be understood that in its broader aspects, the invention is applicable regardless of the particular edge structure involved.

While we have described certain elements of the invention in considerable detail it will be understood that numerous minor modifications may be made without departing from the spirit thereof. We therefore do not intend to limit ourselves otherwise than as set forth in the claims which follow.

Having now fully described our invention, what we claim as new and desire to secure by Letters Patent, is:

1. A nestable, flexible, corrugated metal culvert section, said section being substantially semi-elliptical in cross-section, the radius of curvature being greatest at the edges and smallest at the midpoint, said section along its edges being provided with mutually engageable seating elements, whereby two like sections in mutually reversed and inverted position may be engaged together to form an elliptical culvert by the mutual engagement of the seating elements along the edges of said like sections.

2. A nestable, flexible, corrugated metal culvert section, said section being substantially semi-elliptical in cross-section, the radius of curvature being greatest at the edges and smallest at the midpoint, said section along its edges being provided with mutually engageable seating elements, whereby two like sections in mutually reversed and inverted position may be engaged together to form an elliptical culvert by the mutual engagement of the seating elements along the edges of said like sections, the ellipticity being such that the major axis is about 5% longer, and the minor axis about 5% shorter, than the diameter of a circle of like circumference.

3. A flexible, corrugated metal culvert of elliptical cross-section, comprising a plurality of nestable, like sections, each section being semi-elliptical in cross-section, the radius of curvature being greatest at the edges and smallest at the midpoint, each section having mutually engageable seating elements along its edges, a number of said nestable sections being disposed end to end in lapping relation to form the bottom of the culvert, and a second number of said sections being similarly disposed in inverted and reversed position with the lap joints between sections of said second number in break-joint relation to the lap joints between sections of said first number of sections, and means securing said sections together to hold said culvert in assembled condition.

4. A flexible, corrugated metal culvert of elliptical cross-section, comprising a plurality of nestable, like sections, each section being semi-elliptical in cross-section, the radius of curvature being greatest at the edges and smallest at the midpoint, each section having mutually engageable seating elements along its edges, a number of said sections being disposed end to end in lapping relation to form the bottom of the culvert, and a second number of said sections being similarly disposed in inverted and reversed position with the lap joints between sections of said second number in break-joint relation to the lap joints between sections of said first number of sections, means securing said sections together to hold said culvert in assembled condition, and the ellipticity being such that the major axis of said culvert is about 5% longer, and the minor axis about 5% shorter, than the diameter of a circular culvert of like circumference.

References Cited in the file of this patent

UNITED STATES PATENTS

| | | |
|---|---|---|
| 114,662 | Freeman | May 9, 1871 |
| 556,819 | Hartman | Mar. 24, 1896 |
| 578,801 | Wilmot | Mar. 16, 1897 |
| 1,044,044 | Hardesty | Nov. 12, 1912 |
| 1,140,362 | Dean | May 25, 1915 |
| 1,208,708 | King | Dec. 12, 1916 |
| 2,410,603 | Dubosclard | Nov. 5, 1946 |
| 2,540,141 | Shafer | Feb. 6, 1951 |
| 2,551,787 | Burns | May 8, 1951 |
| 2,587,975 | Darner | Mar. 4, 1952 |

FOREIGN PATENTS

| | | |
|---|---|---|
| 571,714 | Great Britain | of 1945 |